(12) United States Patent
Shiratani

(10) Patent No.: US 7,013,040 B2
(45) Date of Patent: Mar. 14, 2006

(54) 3D IMAGE ACQUISITION APPARATUS AND 3D IMAGE ACQUISITION METHOD

(75) Inventor: Fumiyuki Shiratani, Sagamihara (JP)

(73) Assignee: Olympus Optical Co., Ltd., Tokyo (JP)

(*) Notice: Subject to any disclaimer, the term of this patent is extended or adjusted under 35 U.S.C. 154(b) by 593 days.

(21) Appl. No.: 10/022,864

(22) Filed: Dec. 18, 2001

(65) Prior Publication Data

US 2002/0075456 A1    Jun. 20, 2002

(30) Foreign Application Priority Data

Dec. 20, 2000  (JP)  ............................ 2000-387428

(51) Int. Cl.
    *G06K 9/00*    (2006.01)

(52) U.S. Cl. ...................... 382/154; 382/106; 382/174; 345/420; 356/603; 356/610

(58) Field of Classification Search ................ 382/154, 382/285; 345/419, 420; 356/12, 603, 610; 348/42, 43, 46, 47
See application file for complete search history.

(56) References Cited

U.S. PATENT DOCUMENTS

| | | | |
|---|---|---|---|
| 5,615,003 A | | 3/1997 | Hermary et al. |
| 5,640,962 A | | 6/1997 | Jean et al. |
| 6,252,623 B1 | * | 6/2001 | Lu et al. ........................ 348/47 |
| 6,549,288 B1 | * | 4/2003 | Migdal et al. .............. 356/603 |

FOREIGN PATENT DOCUMENTS

| | | |
|---|---|---|
| DE | 44 15 834 A1 | 11/1995 |
| DE | 197 38 179 C1 | 5/1999 |
| JP | 2565885 B2 | 10/1996 |

OTHER PUBLICATIONS

C. Wust et al: "Surface Profile Measurement Using Color Fringe Projection", Machine Visions and Applications, Springer Verlag, DE, vol. 4, No. 3, pp. 193-203, XP002114480, ISSN: 0932-8092, pp. 194-196, Figures 3-5, 10.

(Continued)

*Primary Examiner*—Bhavesh M. Mehta
*Assistant Examiner*—John Strege
(74) *Attorney, Agent, or Firm*—Frishauf, Holtz, Goodman & Chick, P.C.

(57) ABSTRACT

A 3D image acquisition apparatus comprises a pattern projection section which projects a pattern on an object to be measured, an imaging section which is disposed at a distance from the pattern projection section and images the object on which the pattern has been projected, and a depth calculation section which detects the projection pattern projected on the object on the basis of an image acquired by the imaging section, collates the detected pattern and the projected pattern, and calculates a depth of respective parts of the object on the basis of the correspondency of the collation. The projected pattern is stripes/matrix formed by alternately arranging areas with local maximum/minimum luminance values. Thus, stripes/matrix boundaries can be exactly extracted from the pattern projection image, and correct decoding is performed from the encoded projection image even where the object is not a white-based color one or a low-saturation color one.

8 Claims, 10 Drawing Sheets

OTHER PUBLICATIONS

J. Tajima et al: "3-D Data Acquisition by Rainbow Range Finder", Proceedings of the International Conference on Pattern Recognition, Atlantic City, U.S., Jun. 16-21, 1990. Conference A: Computer Vision and Conference B: Pattern Recognition Systems and Applications, Los Alamitos, IEEE Comp. Soc. Press, U.S., vol. vol. 1 XP000166402 ISBN: 0-8186-2062-5—entire document.

S. Yonezawa et al; Coded Grating Method for Measuring Three Dimensional Objects; 1978; pp. 411-418; vol. J61-D; No. 6.

* cited by examiner

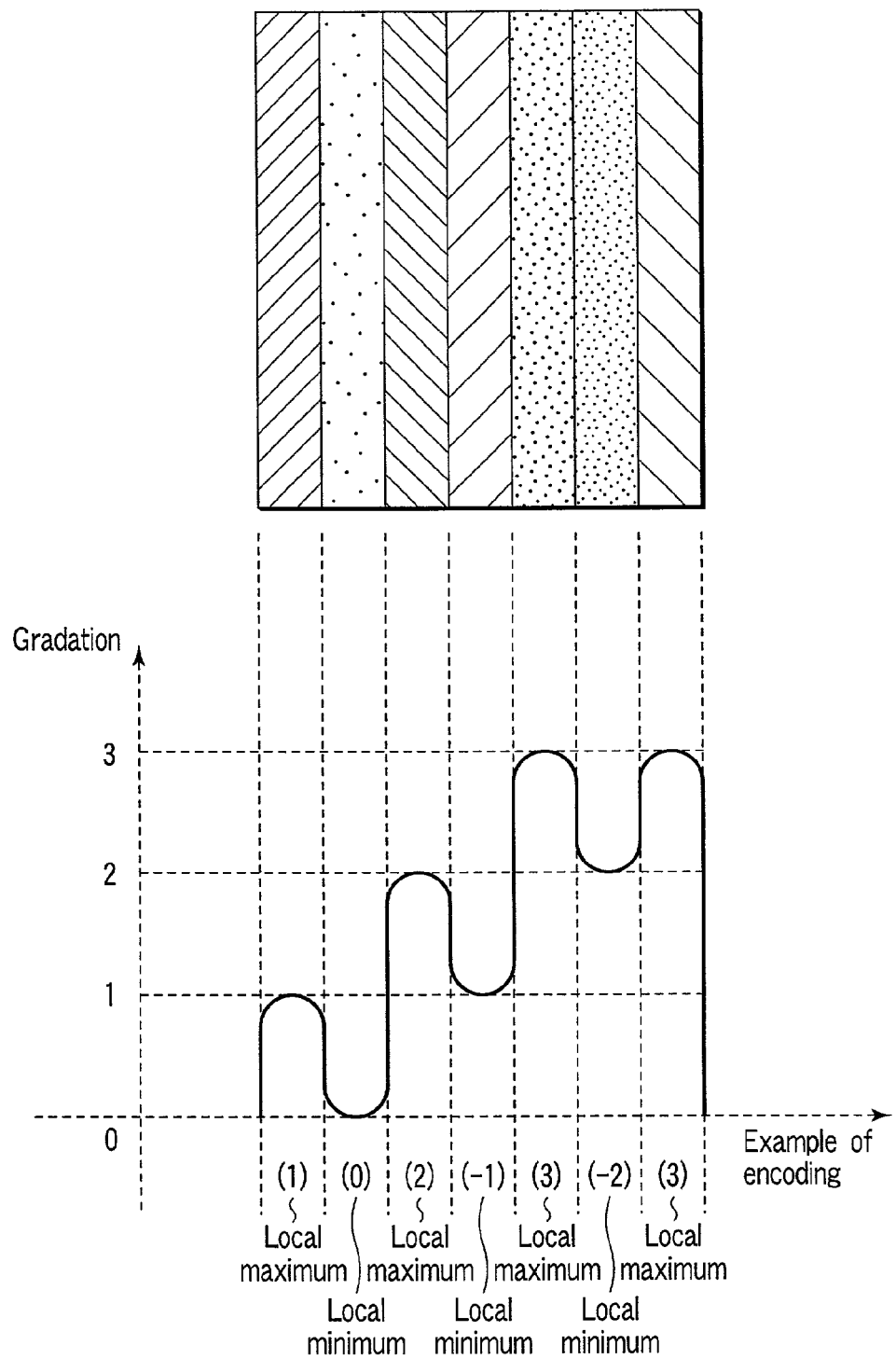
F I G. 1

3D IMAGE ACQUISITION APPARATUS AND 3D IMAGE ACQUISITION METHOD

CROSS-REFERENCE TO RELATED APPLICATIONS

This application is based upon and claims the benefit of priority from the prior Japanese Patent Application No. 2000-387428, filed Dec. 20, 2000, the entire contents of which are incorporated herein by reference.

BACKGROUND OF THE INVENTION

1. Field of the Invention

The present invention relates to a 3D (Three Dimensional) image acquisition method for a technique of measuring a 3D shape of an object in a non-contact state, and a 3D image acquisition apparatus for carrying out this method.

2. Description of the Related Art

Conventional 3D object shape measuring methods applied to 3D image acquisition apparatuses as 3D shape measuring techniques are generally classified into two types. One is a method in which the time of propagation of light is measured, and the other is a method making use of a "principle of triangulation". The former is a theoretically ideal method because there is no dead angle, but it has problems with measured time and precision. Thus, the latter using "principle of triangulation" is mainly used.

Methods using the principle of triangulation are classified into an active method and a passive method called "passive stereo method". In the passive stereo method, features in the images obtained by two cameras situated at different locations are made to correspond. On the basis of a result of the correspondence and a pre-measured positional relationship between two cameras, a distance up to an object is found by the principle of triangulation. The passive stereo method, however, has drawbacks that the correspondence of features in the images is difficult and the shape of an object without texture cannot be measured.

As an example of the active method using the principle of triangulation, there is known a "light projection method". In this method, one of the two cameras, is replaced with a light source, and an image of the light source at the surface of the object is observed by the camera situated at the other point and the shape of the object is measured. The "light projection method" is also classified into "spot light projection method", "slit light projection method" and "pattern light projection method".

In the spot light projection method, only a point of an object can be measured by a single image input. In the slit light projection method, one line of an object can be measured by a single image input. However, in order to measure the shape of the entire area of the object, image input needs to be repeated a number of times by scanning projection light, and a great deal of time is required.

On the other hand, in the pattern light projection method, a two-dimensional (2D) pattern such as a stripe pattern or a matrix pattern is projected. This method is advantageous in that only one input of a pattern projection image needs to be performed.

The pattern light projection method is also called "spatial encoding method". The "spatial encoding method" is classified into "pattern shape encoding" and "gradation encoding". As the pattern shape encoding, a method using a distribution of opening width of a slit and a method using an M-series encoding have been proposed, but these are less practical because of problems with measurement density and stability of measurement.

Meanwhile, the "gradation encoding" is classed into "gray scale encoding" and "color tone encoding". However, either method has a drawback that the number of recognizable gradations is small. As regards the gray scale encoding, the maximum number of recognizable gradations is normally 5. As regards the color tone encoding, a greater number of gradations are not usable, except the cases of white and low-saturation colors.

To solve these problems, a method has been proposed wherein one code is assigned to a combination a plurality of colors or gray levels.

Prior-art matrix pattern encoding and stripe pattern encoding will now be described.

As regards the matrix pattern, U.S. Pat. No. 2,565,685, for instance, discloses a "spatial pattern encoding method". This method employs a multi-pattern matrix plate pattern, which has gray scale areas of three or more values, color areas of three or more colors, or three or more gradation areas of a combination of gray scales and colors. In this method, at least three kinds of gradation areas adjoin at an intersection of boundary lines of gradation areas. Major codes corresponding to the kinds and order of gradations are assigned to intersections of a projection image produced by projecting the pattern on the object. Then, the major codes, or combinational codes of major code at the intersection and major codes of intersections around this intersection, are given as characteristic codes for intersection recognition.

FIG. 9 shows an example of the matrix pattern using three-value gradations in the above-described prior-art spatial pattern encoding method. White is represented by "2", black is by "0", and gray is by "1". FIG. 10 is a block flow chart illustrating the process by the spatial pattern encoding method.

In step ST1001, recognition thresholds for three-value conversion are found. In step ST1002, three-value conversion for each pixel is effected, like "0", "1" or "2".

In step ST1003, node selection is effected to extract, as a node, the corner or edge intersection of each matrix plate area of the multi-value matrix pattern.

In step ST1004, a decoding process is performed to provide one of a plurality of codes as a major code in accordance with a gradation distribution surrounding the extracted node.

In step ST1005, a result of code recognition and code numbering is recorded on a table (memory).

This method is advantageous in that it provides a pattern structure which can produce many characteristic codes by only single projection of the pattern with at least three gradations.

In order to derive encoded information from a received pattern and derive 3D information, it is important to exactly read a luminance variation and to detect as exactly as possible boundaries of one block in the matrix. A graph shown below the matrix pattern in FIG. 9 indicates gradations of the second line from above in the matrix pattern. The inclination of a graph curve increases near inflection points (i.e. two occurrences of (1) in (1)(2)(1) in FIG. 9), which are neither local maximum points or local minimum points, due to diffusion of projected light. Consequently, extraction of a matrix structure (division of blocks in the matrix) becomes disadvantageously unstable. In short, the degree of deviation to the left and right of an inflection point increases, and the reliability lowers.

FIG. 11 shows prior art in the case where gradations of three colors, R (Red), G (Green) and B (Blue), are used in the spatial pattern encoding method. Assume that "0" is assigned to R, "1" to G, and "2" to B.

A graph below the matrix pattern in FIG. 11 indicates luminance values of R, G and B of the second line from above in the matrix pattern. For example, in the case of an object (a high-saturation red object) having such surface reflectance characteristics that reflection signals of a G component and a B component are substantially zero while a reflection signal of an R component is large, a signal of a local maximum is obtained at the luminance value of R in the second line from above in the pattern of FIG. 11. By contrast, the luminance values of G and B have nearly noise levels. In this situation, decoding is impossible. Similarly, decoding is very difficult for an object having such surface reflectance characteristics that even one of reflection signals of R, G and B is substantially zero. In order words, decoding is successfully carried out for an object surface of a white-based color or a low-saturation color. However, for an object having such surface reflectance characteristics that even one of reflection signals of R, G and B components may take a nearly zero value, determination based on a color obtained from a combination of R, G and B is difficult.

Prior art of a stripe pattern, which is disclosed in, e.g. the Journal of the Institute of Electronics and Communication Engineers (Vol. J61-D, No. 6, pp. 411–418, 1978), will now be described. FIG. 12 shows an example of a stripe pattern encoded by colors of R, G and B. This example differs from the example of FIG. 11, not only because the former is a stripe and the latter is a matrix, but also because black areas (hatched in FIG. 12) are present among R, G and B. The presence of black areas reduces the possibility of mixing of colors due to diffusion of light.

However, in this prior-art example, too, decoding is difficult for an object having such surface reflectance characteristics that even one of reflection signals of R, G and B components may take a nearly zero value.

The present invention has been made to solve the problems of the above-described prior art. The object of this invention is to provide a 3D image acquisition method and a 3D image acquisition apparatus based on spatial pattern encoding, wherein stripe boundary extraction from a stripe pattern projection image and block boundary extraction from a matrix pattern projection image can exactly be performed, and exact decoding is performed from an encoded projection image of an object even where the object is not of a white-based color or a low-saturation color.

BRIEF SUMMARY OF THE INVENTION

In order to solve the above problems and achieve the object, the present invention provides the following means. Specifically, in the 3D image acquisition method of this invention, spatial pattern encoding is used to measure the shape of a 3D object in a non-contact state. A pattern is projected, and the correspondency between a reception-light pattern and a projection-light pattern is found. Thereby, depth information of an object is acquired. The 3D image acquisition apparatus of this invention is provided to carry out this method.

According to a first aspect of the invention, there is provided a 3D image acquisition apparatus comprising: a pattern projection section which projects a predetermined pattern on an object; an imaging section which is disposed at a predetermined distance from the pattern projection section and images the object on which the predetermined pattern has been projected; and a depth calculation section which detects the projection pattern projected on the object on the basis of an image acquired by the imaging section, collates the detected projection pattern and the predetermined pattern projected by the pattern projection section, and calculates a depth of respective parts of the object on the basis of the correspondency of the collation, characterized in that the predetermined pattern projected by the pattern projection section is formed by alternately arranging areas with local maximum luminance values and areas with local minimum luminance values.

According to a second aspect of the invention, there is provided a 3D image acquisition apparatus comprising: a pattern projection section which projects a predetermined pattern on an object; an imaging section which is disposed at a predetermined distance from the pattern projection section and images the object on which the predetermined pattern has been projected; and a depth calculation section which detects an image pattern on the basis of an image acquired by the imaging section, collates the detected image pattern and the predetermined pattern projected by the pattern projection section, and calculates a depth of respective parts of the object on the basis of the correspondency of the collation, characterized in that the predetermined pattern projected by the pattern projection section is formed by combining patterns of a plurality of color components, and the patterns of the plurality of color components are formed by alternately arranging areas with local maximum luminance values and areas with local minimum luminance values.

In this 3D image acquisition apparatus, in the patterns of the plurality of color components, positions of the areas with local maximum luminance values and positions of the areas with local minimum luminance values are aligned.

In this 3D image acquisition apparatus, in the patterns of the plurality of color components, positions of the areas with local maximum luminance values and positions of the areas with local minimum luminance values are shifted.

In the above 3D image acquisition apparatus, the color components are RGB components.

In this 3D image acquisition apparatus, the projected predetermined pattern is a stripe pattern or a matrix pattern.

According to a third aspect of the invention, there is provided a 3D image acquisition method comprising: a step of projecting a predetermined pattern on an object; a step of imaging the object on which the predetermined pattern has been projected, at a position at a predetermined distance from a position where the predetermined pattern has been projected; and a step of detecting a pattern on the basis of an image acquired by the imaging step, collating the detected pattern and the pattern projected by the pattern projection step, and calculating a depth of respective parts of the object on the basis of the correspondency of the collation, characterized in that the predetermined pattern projected by the pattern projection step is formed by alternately arranging areas with local maximum luminance values and areas with local minimum luminance values.

According to a fourth aspect of the invention, there is provided a 3D image acquisition method comprising: a step of projecting a predetermined pattern on an object; a step of imaging the object on which the predetermined pattern has been projected, at a position at a predetermined distance from a position where the predetermined pattern has been projected; and a step of detecting a pattern on the basis of an image acquired by the imaging step, collating the detected pattern and the pattern projected by the pattern projection step, and calculating a depth of respective parts of the object on the basis of the correspondency of the collation, characterized in that the predetermined pattern projected by the pattern projection step is formed by combining patterns of a plurality of color components, and the patterns of the plurality of color components are formed by alternately arranging areas with local maximum luminance values and areas with local minimum luminance values.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 illustrates a light pattern structure when pattern light is projected in a 3D image acquisition method according to a first embodiment of the present invention;

DETAILED DESCRIPTION OF THE INVENTION

Figure 2:
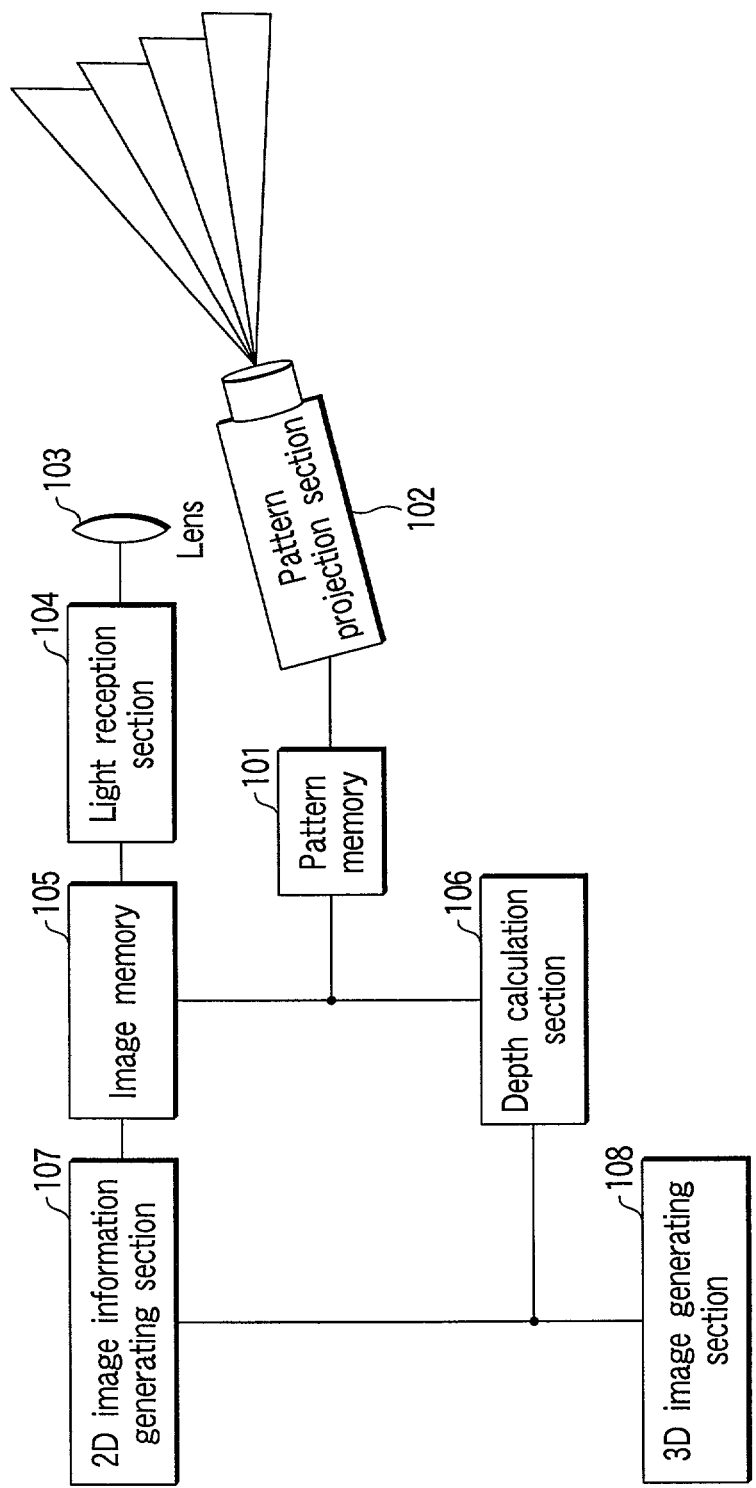
FIG. 2 schematically shows the structure of a 3D image acquisition apparatus according to the first embodiment.

Embodiments of the present invention will now be described with reference to FIGS. 1–8.

(First Embodiment)

A first embodiment of the invention will now be described in detail with reference to FIGS. 1–3.

In order to describe a pattern light projection method for spatial pattern encoding according to the first embodiment, FIG. 1 shows a four-gradation stripe pattern by way of example. This pattern is a predetermined light pattern which is projected on an object when a 3D image of the object is to be acquired, for example, in order to measure the shape of the object.

This predetermined pattern comprises a plurality of areas (stripes in FIG. 1) each having a substantially constant luminance value. The luminance (gradation) of each area belongs to any one of predetermined luminances (gradations). In FIG. 1, each stripe belongs to any one of four gradations (0, 1, 2, 3). In this example, pattern areas having local maximum luminance values and local minimum luminance values are alternately arranged.

Each area is arranged such that if one of its adjacent areas has a higher luminance (gradation) than itself, the other adjacent area also has a higher luminance (gradation) than itself. In addition, each area is arranged such that if one of its adjacent areas has a lower luminance (gradation) than itself, the other adjacent area also has a lower luminance (gradation) than itself. Both adjacent areas have different luminances (gradations).

In the encoding of respective stripe patterns, as shown in the graph of FIG. 1, local maximum values and local minimum values are alternately arranged. Local maximum values of gradations 1, 2 and 3 are expressed by (1), (2) and (3), and local minimum values of gradations 0, 1 and 2 are expressed by (0), (−1) and (−2). Using these expressions, a description will be given of the spatial pattern encoding method in which the same code does not appear twice in the arrangement of the stripes. In this case, the order of stripe patterns are determined under conditions that the gradation of a location minimum is lower than the gradations of right and left local maximums, odd-number-th stripes have local maximum values, and even-number-th stripes have local minimum values.

In the example of FIG. 1, if four numerals arranged in the order of a local maximum, a local minimum, a local maximum and a local minimum are encoded into one code, two codes, i.e. [(1) (0) (2) (−1)] and [(2) (−1) (3) (−2)], are obtained. In this case, the two successive codes share numerals (2) and (−1), which are the right-hand two numerals of the left-hand code and are the left-hand two numerals of the right-hand code. If codes are arranged to share the same numerals, arrangements of (2m+2) stripes are obtained when the number of codes is m. When the number of gradations is 4 and the code length is 4, the number of codes, m, is 30. Accordingly, in the case where information of 4 gradations is combined with local maximum/minimum information, if encoding is effected by the arrangement of four stripes, 62 stripes are obtained.

The spatial pattern encoding process according to the present invention will now be described with reference to a flow chart of FIG. 3. In step ST301, stripes at positions of local maximums and local minimums are detected on the basis of a pattern projection image. These stripes can be detected by extracting edge portions of stripes through a "Sobel" filter or the like and determining whether an area interposed between the detected edge portions has a local maximum or a local minimum.

In the next step ST302, the gradation of the area interposed between the edge portions is determined.

In step ST303, a decoding process is performed by numerically converting the information of local maximum/minimum of the area between edge portions and the gradation information. In step ST304, the obtained numerical information is recorded on a table in a memory. The numerical information is collated with prestored information in a pattern memory 101 (to be described later).

In the case of four gradations, a code having the coincident order of arrangement of four numerals is found. If there are two or more coincident codes, a code having a greatest length of a successive coincident portion is selected as one with highest reliability. In this way, the correspondency of 1 to 1 (at most) is determined between each stripe of a projection-light pattern and each stripe of a reception-light pattern, and depth-dimensional information of the object to be measured is calculated from the well-known "principle of triangulation".

A description will now be given of a 3D image acquisition apparatus for acquiring a 3D image by using a pattern obtained by the above-described spatial pattern encoding method.

Figure 3:
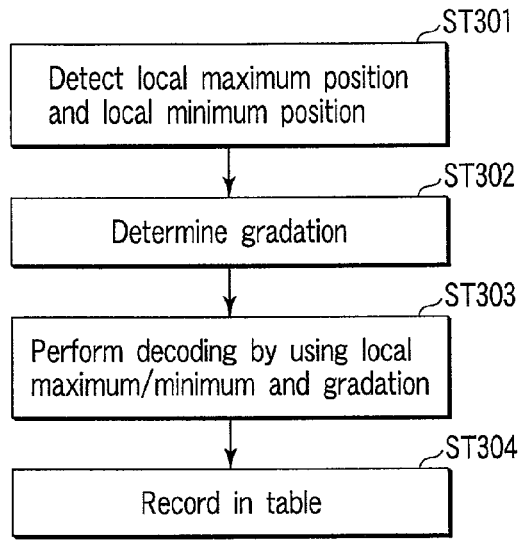
FIG. 3 is a block flow chart illustrating the process in the 3D image acquisition method according to the first embodiment.

FIG. 2 schematically shows an example of the structure of a 3D image acquisition apparatus according to the first embodiment. This 3D image acquisition apparatus projects a predetermined pattern on an object to be measured, acquires an image of the object, and collating an obtained detection pattern and the projected pattern, thereby measuring depth dimensions of respective parts of the object. This apparatus comprises the following elements.

A pattern memory 101 that prestores a predetermined pattern of projection light is connected to a pattern projection section 102 for projecting the light of the predetermined pattern on an object to be measured (not shown). This predetermined pattern is projected from the pattern projection section 102 on the object in the state in which areas with local maximum luminance values and local minimum luminance values are alternately arranged, for example, as shown in FIG. 2.

Imaging means for imaging the object, on which the predetermined pattern has been projected, is disposed at a predetermined distance from the pattern projection section 102. The imaging means comprises a lens 103 for collecting reflection light from the object, and a light reception section 104 for receiving the collected reflection light.

An image memory 105 that stores information of the light received by the light reception section 104 of the imaging means is connected to the imaging means. The image memory 105 and pattern memory 101 are connected so that a pattern can be detected on the basis of an image acquired by the imaging means (the imaging section including the light collection lens 103 and light reception section 104). A depth calculation section 106 is provided as depth calculation means for collating the detected pattern with the pattern projected by the pattern projection section 102, and calculating the depth dimension of the respective parts of the object on the basis of the correspondency between the two collated patterns.

A 2D image information generating section 107 for generating 2D image information on the basis of the information stored in the image memory 105 is connected to a 3D image generating section 108. The 3D image generating section 108 generates a 3D image on the basis of the 2D image information generated by the 2D image information generating section 107 and the depth dimension value calculated by the depth calculation section 106.

The operation of the 3D image acquisition apparatus will now be described.

Pattern encoding information is prestored in the pattern memory 101. To start with, in order to acquire an image without a pattern, the light collection lens 103 collects reflection light from the object, and the light reception section 104 receives the collected reflection light. The information of the received light is stored in the image memory 105. The 2D image generating section 107 generates two-dimensional photographic information. Based on this information, surface reflectance characteristics of the object are obtained. The surface reflectance characteristics of the object obtained from the image with no pattern are used as a base (reference) for comparison of luminance, when pattern information is extracted from the image acquired from the object on which the pattern light is projected.

A predetermined pattern is projected on the object, and reflection light from the object is collected by the collection light 103. The collected light is received by the light reception section 104 and then stored in the image memory 105. The depth calculation section 106 compares and collates the information stored in the pattern memory 101 and the pattern information stored in the image memory 105, thereby determining the correspondency between the projection-light pattern and the reception-light pattern.

The incidence angle is calculated on the basis of the information of the light reception point and the focal distance, and the depth dimension is calculated by the principle of triangulation on the basis of the information of the distance between the light emission point and light reception point and the light emission angle. Since the optical parameters (e.g. focal distance) of the lens 103 and the size of the light reception section are known, the incidence angle is determined on the basis of the position (light reception position) on the acquired image. The distance between the light emission point and light reception point is determined by the structure of the apparatus. The light emission angle is determined by the pattern on the image.

At last, the 3D image generating section 108 generates a 3D image on the basis of the 2D image generated by the 2D image generating section 107 and the depth dimension value calculated by the depth calculation section 106.

According to the above-described structure of the 3D image acquisition apparatus of the first embodiment, the areas with local maximums and the areas with local minimums are alternately arranged on the pattern employed. Thus, the stripe image (stripe boundary) can easily be extracted.

Moreover, each band of R, G and B is encoded based on the combination of local maximum/minimum information and gradation information. The range of objects for 3D shape measurement is not limited to white-based color objects and low-saturation color objects and is increased.

(Second Embodiment)

Figure 4:
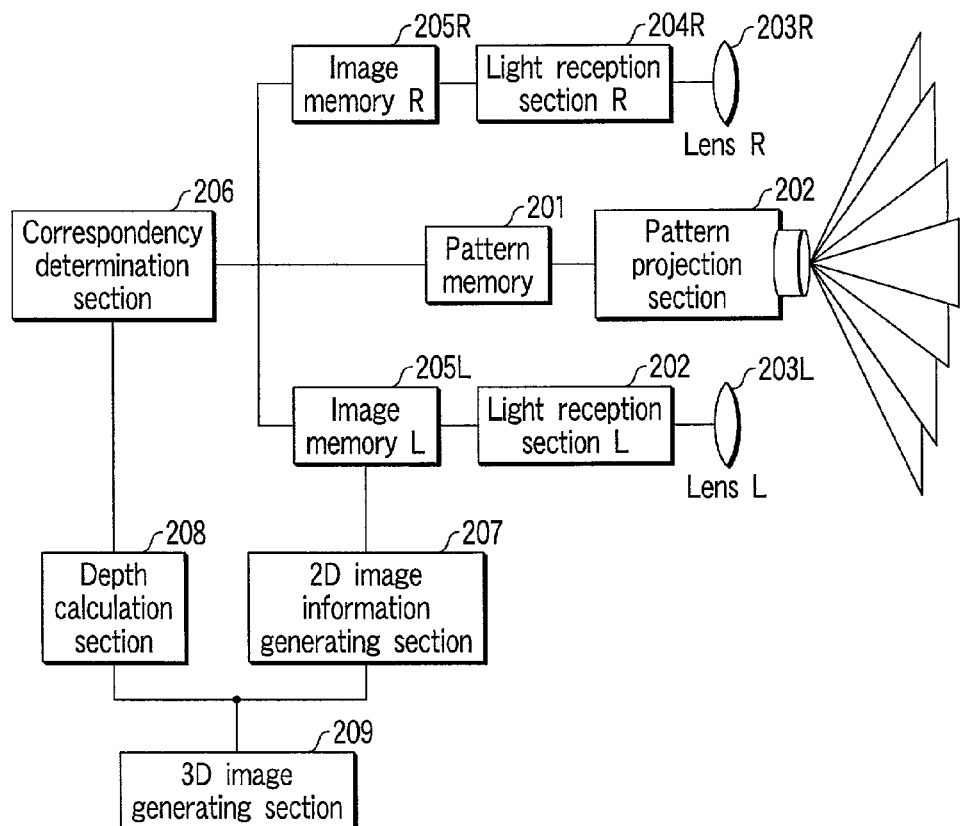
FIG. 4 schematically shows the structure of a 3D image acquisition apparatus according to a second embodiment of the invention.

A second embodiment of the present invention will now be described with reference to FIG. 4. The second embodiment is substantially similar to the first embodiment shown in FIG. 2 with respect to the spatial pattern encoding method. However, as shown in FIG. 4, the structure of the 3D image acquisition apparatus is different, as described below. The imaging means are provided at a plurality of locations with different viewpoints, for example, on the right and left sides (two locations) of the pattern projection section 202. Accordingly, a pair of image memories are provided on the right and left sides. Moreover, means for determining the right-and-left correspondency is additionally provided.

More specifically, the 3D image acquisition apparatus according to the second embodiment comprises a pattern memory 201 storing a predetermined projection-light pattern; a pattern projection section 202 for projecting the pattern light on the object; light collection lenses 203R and 203L and light reception sections 204R and 204L constituting, e.g. right and left imaging means disposed at two locations; right and left image memories 205R and 205L; a correspondency determination section 206 for determining the correspondency between the projected pattern and detected pattern; a 2D image information generating section 207; a depth calculation section 208; and a 3D image generating section 209.

The operation of the 3D image acquisition apparatus according to the second embodiment will now be described.

Like the first embodiment, images without patterns are acquired in advance. These images acquired at two locations with different viewpoints are stored in the image memories 205R and 205L.

If a predetermined pattern is projected on the object, the projected pattern is reflected by the object and collected by the collection lenses 203R and 203L disposed at two different positions (L (left) and R (right)) in this case). The collected reflection light is received by the light reception sections 204R and 204L, respectively, and then stored in the image memories 205R and 205L.

The correspondency determination section 206 performs four kinds of collations between: ① the projection-light pattern and the pattern received by the left light reception section 204L; ② the projection-light pattern and the right light reception section 204R; ③ the images without patterns received by the left light reception section 204L and the right light reception section 204R; and ④ the images with patterns received by the left light reception section 204L and the right light reception section 204R. This considerably reduces the difficulty in the "passive stereo method" in the collation with non-texture areas.

In the first embodiment, the correspondency between the projection-light pattern and reception-light pattern is used as the basis for calculation of depth dimensions. In the second embodiment, the correspondency between the right and left images without patterns and the correspondency between the right and left images with patterns are also used, and the collation with higher reliability can be realized.

At last, the 3D image generating section 209 generates a 3D image on the basis of the 2D image information obtained by the 2D image information generating section 207 and the depth dimension value calculated by the depth calculation section 208.

As has been described above, according to the structure of the 3D image acquisition apparatus of the second embodiment, pattern projection images are obtained by the imaging elements situated at locations of two or more viewpoints. Not only the correspondency between the projection-light pattern and reception-light pattern but also the correspondency between plural images is performed. Thus, more exact correspondency is achieved and the measurement precision and reliability are enhanced.

(Third Embodiment)

A third embodiment of the present invention will now be described with reference to FIGS. 5 and 6.

The structure of the 3D image acquisition apparatus used in the first embodiment is substantially the same as that of the 3D image acquisition apparatus of the third embodiment. However, the spatial pattern encoding method is different, as shown in FIG. 5.

Figure 5:
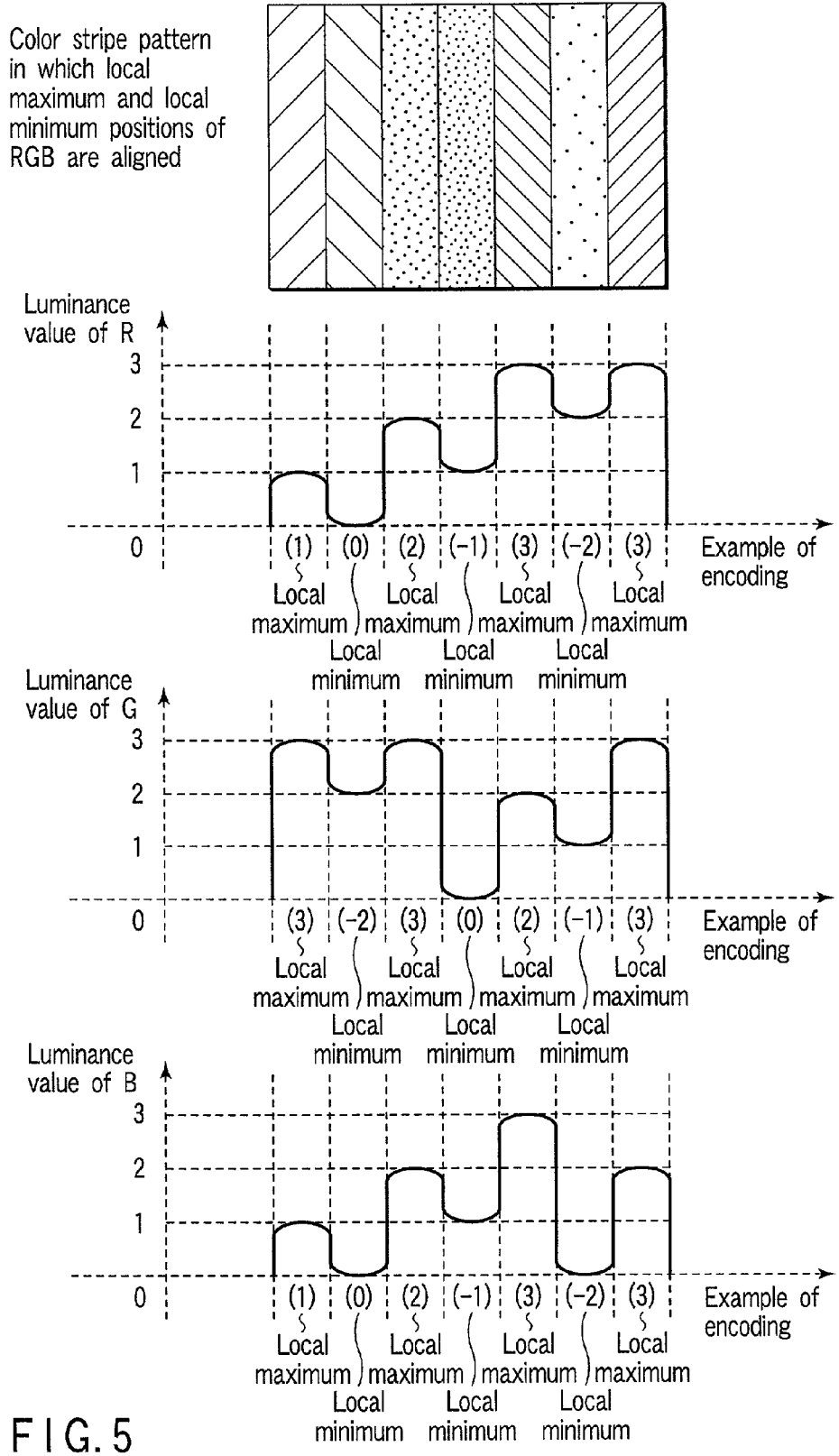
FIG. 5 illustrates a light pattern structure when pattern light is projected in a 3D image acquisition method according to a third embodiment of the invention.
Figure 6:
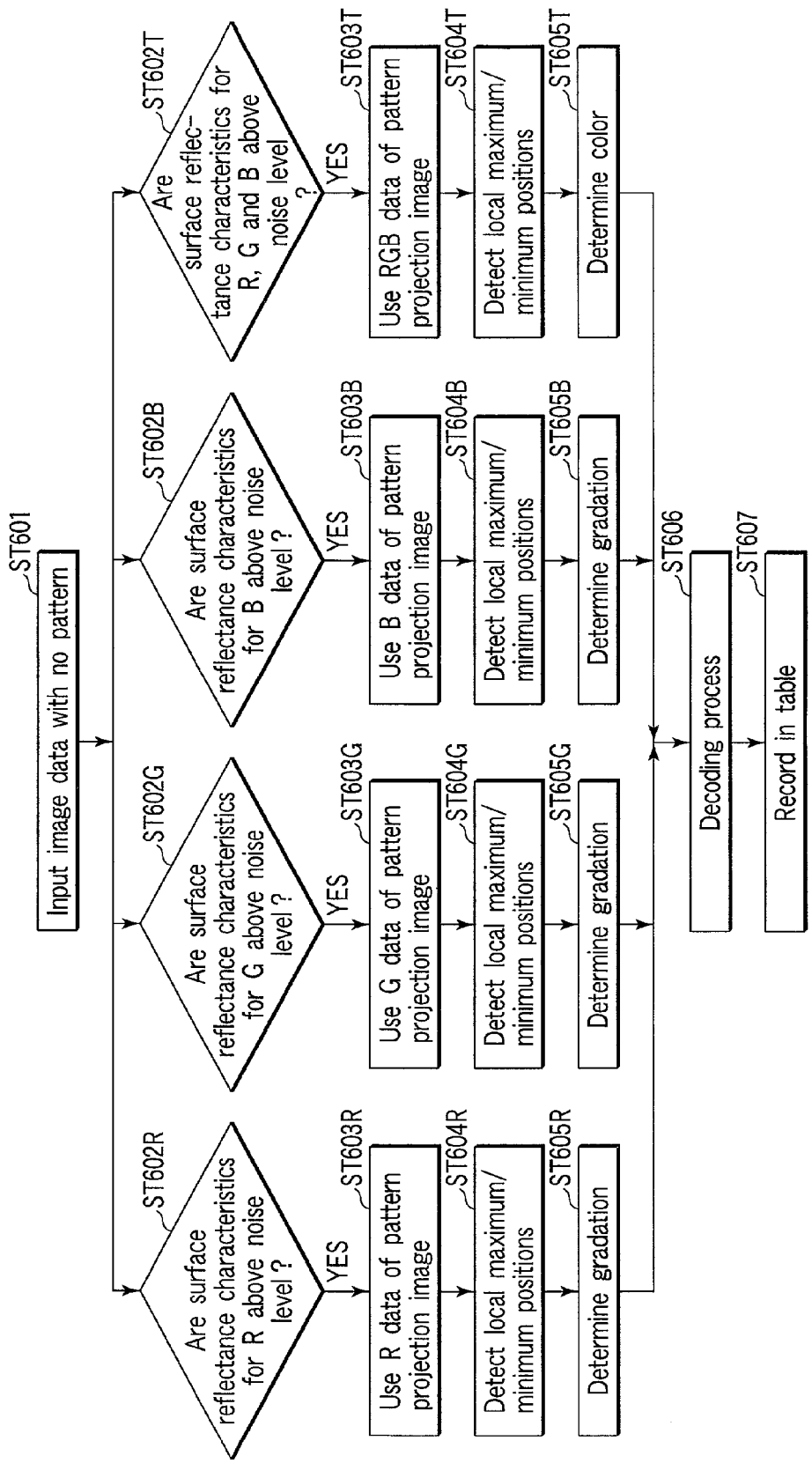
FIG. 6 is a block flow chart illustrating the process in the 3D image acquisition method according to the third embodiment.

FIG. 5 shows an example of a stripe pattern in which local maximums/minimums of a plurality of color signals are aligned. Gray scale values are used in the structure of the pattern adopted in the first embodiment. On the other hand, the pattern used in the third embodiment is a pattern of respective color components (R, G, B), and areas with local maximum luminance values and areas with local minimum luminance values are aligned. As is shown in FIG. 5, in the color stripe pattern, local maximum positions and local minimum positions of RGB are aligned.

R, G and B signals are individually encoded, and a decoding process is carried out by using R, G and B signals whose reflectances are not at noise level. If the reflectances of all R, G and B signals are not at noise level, a color decoding process is attempted, and color information is used in the decoding process. In addition, since local maximums and local minimums are alternately present, the extraction of a pattern image is advantageously facilitated.

A processing operation relating to the 3D image acquisition apparatus according to the third embodiment will now be described. The flow chart of FIG. 6 illustrates the process based on the 3D image acquisition method.

In step ST601, image data without a pattern is input.

In steps ST602R, ST602G and ST602B, the R, G and B components of the image data are determined, and the amount of projected R, G and B light returned from the object is checked. Thereby, the reflectance characteristics of the surface of the object are approximately determined. At this time, if the R component of the reflection light is at noise level and near zero, the R component of the pattern projection image is also near zero in the near region. Thus, the data of the R component cannot be decoded. The same applies to the data of the G component and B component.

The above matters are determined. If the data of the R component of R, G and B of the image, for example, is not at noise level, the data of the R component of the pattern projection image is used (ST603R). At this time, in step ST604R, the local maximum/minimum of the R component data is detected. In subsequent step ST605R, the gradation of the local maximum/minimum area is found. Similarly, the data of the G component and B component is subjected to the same processing (ST603G, ST604G, ST605G; ST603B, ST604B, ST605B)

On the other hand, in steps ST602T to ST605T, the following process is performed. If the surface reflectance characteristics of R, G and B are all above the noise level, the colors of the projection-light pattern are estimated. The estimation of colors is carried out by dividing the RGB components of the pattern projection image by the RGB components of the image with no pattern and finding their ratio. If the surface reflectance characteristics of R, G and B are all higher than the noise level, the RGB data of the pattern projection image is used to detect local maximums/minimums of the data and to determine the colors.

In step ST606, a decoding process is performed by numerically converting the information of local maximum/minimum of the area to be processed and the gradation information. In step ST607, the obtained numerical information is recorded on the table in the memory. Then, the numerical information is collated with prestored information in the pattern memory 101. Based on the principle of triangulation, the depth information of the object is calculated.

In the pattern used in the 3D image acquisition apparatus of the third embodiment, the areas with local maximum luminance values and the areas with local minimum luminance values of R, G and B are aligned. The decoding can be performed on the basis of not only the luminance values and local maximum/minimum information of R, G and B in the graph, but also the color information determined by the R, G and B values in each stripe.

Even where two of the three R, G and B signals are not at the noise level, the two signals can be used for the decoding.

Since encoding for R, G and B is individually performed, the decoding process can be performed by combining the individual encoding of R, G and B and the reliability for the decoding is enhanced.

(Fourth Embodiment)

Figure 7:
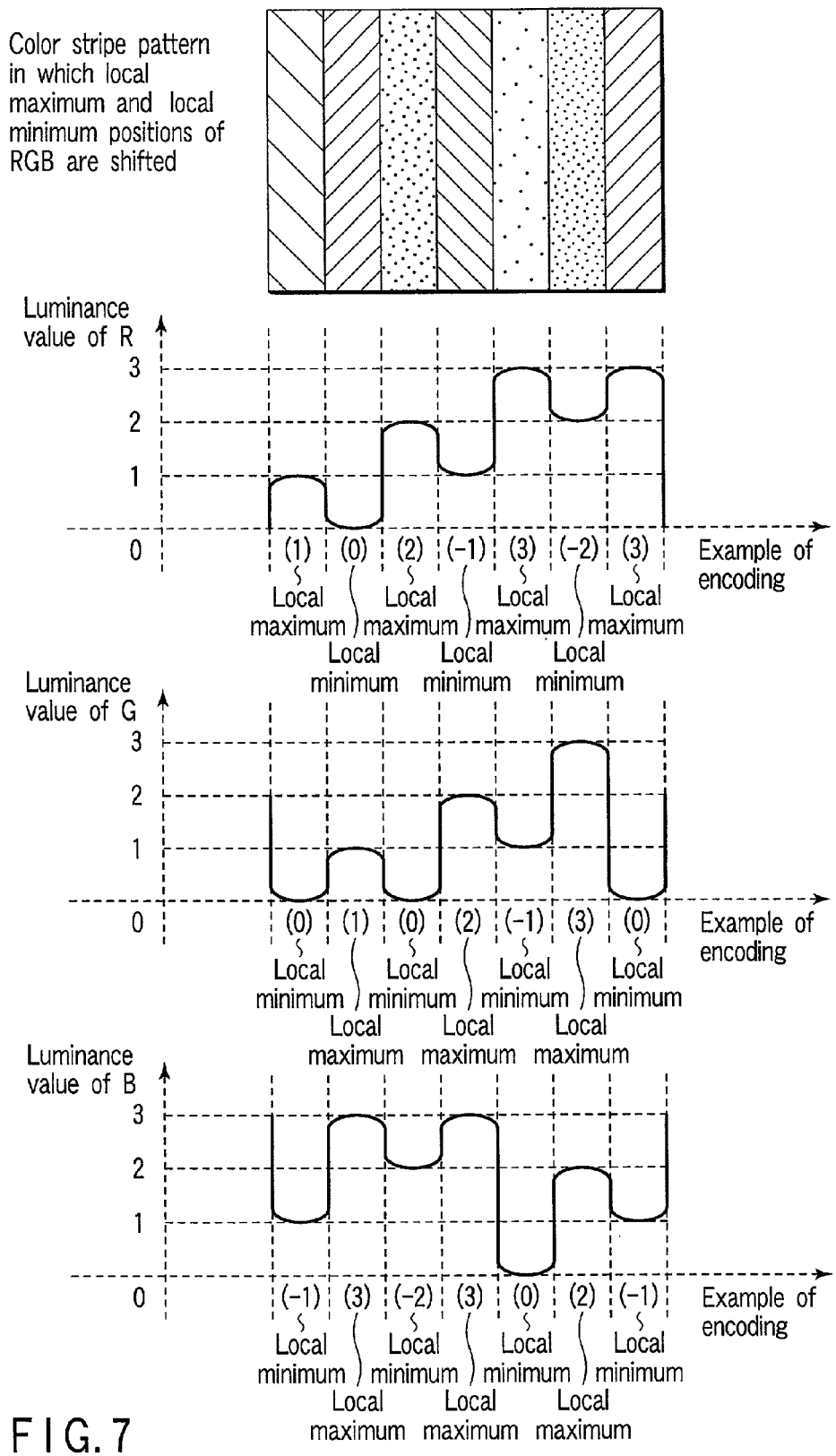
FIG. 7 illustrates a light pattern structure when pattern light is projected in a 3D image acquisition method according to a fourth embodiment of the invention.

FIG. 7 shows an example of a pattern structure for use in pattern light projection in a 3D image acquisition method according to a fourth embodiment of the invention.

The structure of the 3D image acquisition apparatus used in the fourth embodiment is substantially the same as that of the 3D image acquisition apparatus of the third embodiment. However, the form of the pattern used in the spatial pattern encoding method is different. Specifically, as shown in FIG. 7, the pattern used in this embodiment is a color stripe pattern in which local maximum/minimum positions of R. G and B signals are shifted. More specifically, the local maximum position of the R signal is displaced from the local maximum positions of the remaining G and B signals. In other words, in the stripe pattern of this embodiment, the local maximum luminance values and local minimum luminance values of each of the R, G and B component are alternately arranged, and the local maximum position of the R signal coincides with the local minimum positions of the remaining G and B signals.

In the pattern used in the 3D image acquisition in the fourth embodiment, the area with a local maximum luminance differs from the area with a local minimum luminance, and the local maximum positions and local minimum positions of R, G and B are shifted. In more general terms, in the pattern used in this embodiment, the areas with local maximum luminance values and the areas with local minimum luminance values of each of the color components are alternately arranged, and the position of the area with the local maximum luminance (the position of the area with the local minimum luminance) of the pattern of at least one of the color components coincides with the position of the area with the local minimum luminance (the position of the area with the local maximum luminance) of the patterns of the other color components.

The method using this pattern is advantageous in that if the reflectances of all R, G and B signals are not at the noise level, the chroma become higher than in the case of the third embodiment in which the local maximum/minimum positions of all R, G and B are aligned, and the color determination process becomes easier than in the third embodiment.

(Fifth Embodiment)

The structure of a 3D image acquisition apparatus used in the fifth embodiment is substantially the same as that of the 3D image acquisition apparatus of the first embodiment. However, the form of the pattern used in the spatial pattern encoding method is different, as will be described below.

Figure 8:
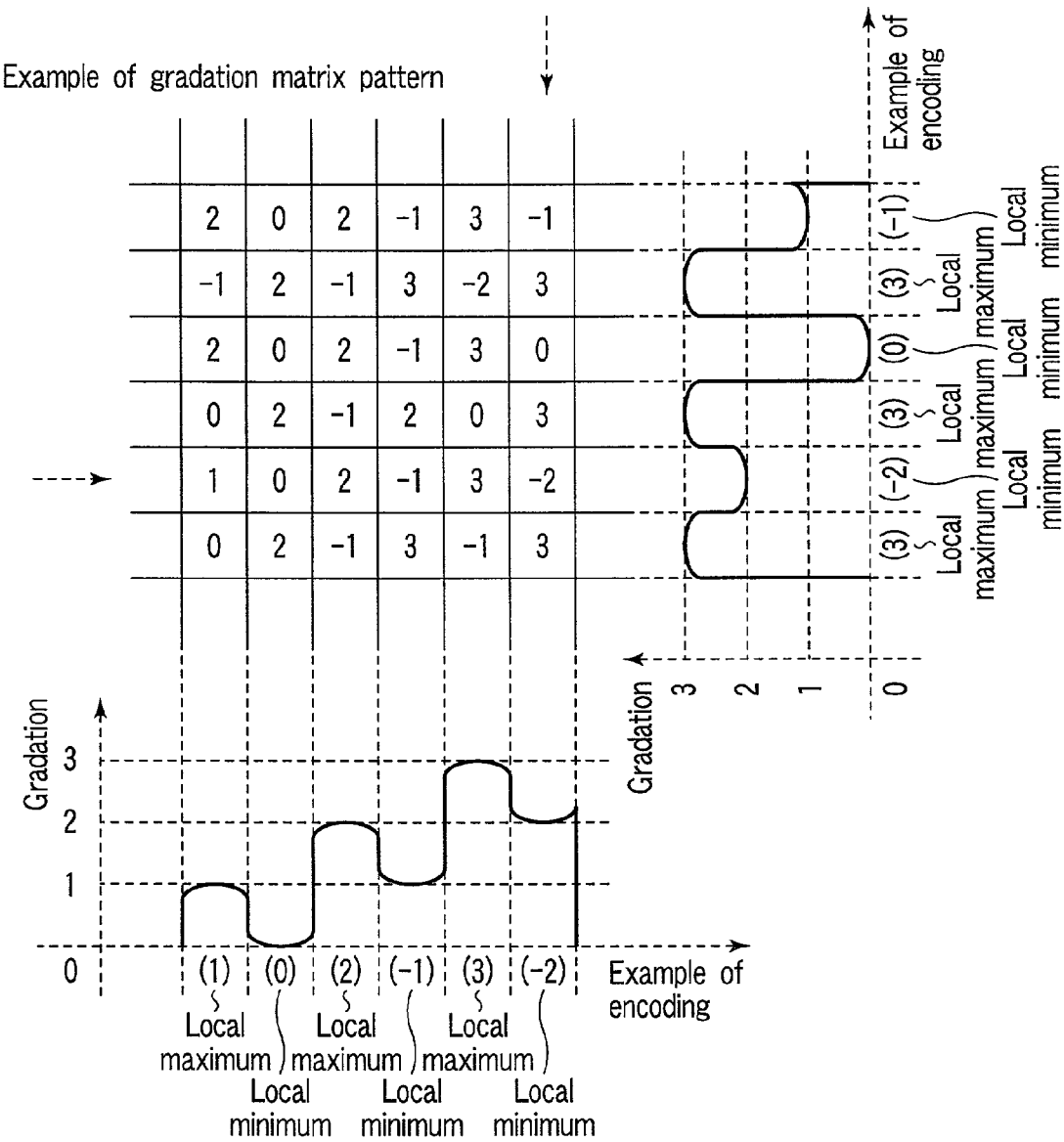
FIG. 8 illustrates a light pattern structure when pattern light is projected in a 3D image acquisition method according to a fifth embodiment of the invention.
Figure 9:
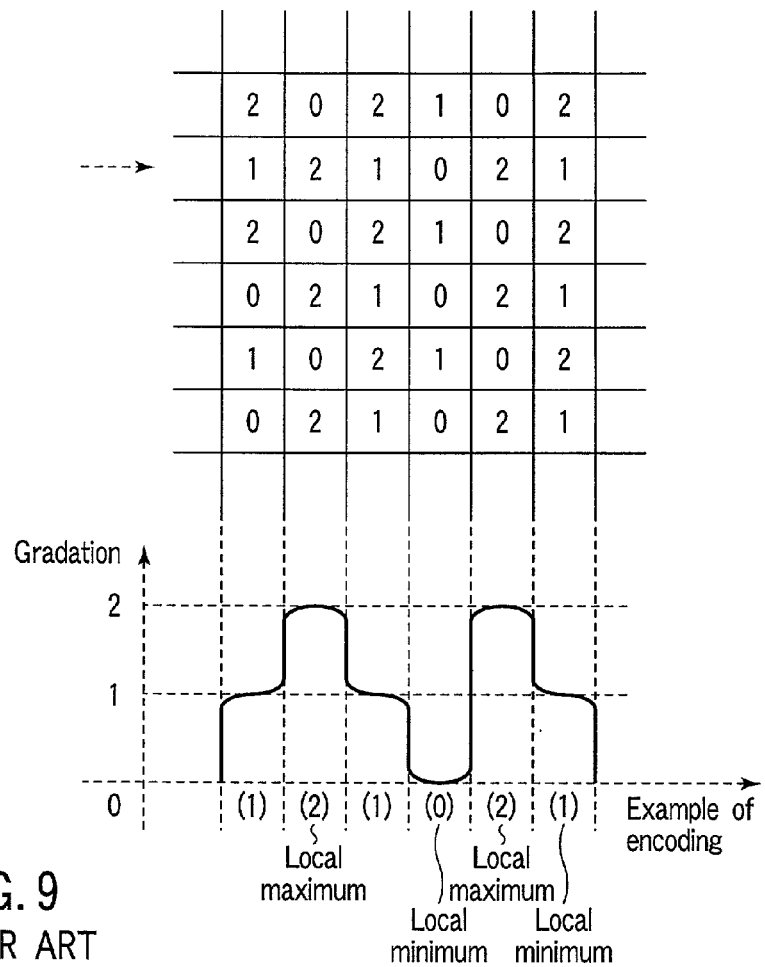
FIG. 9 shows an example of a matrix pattern using three-value gradations in a prior-art spatial pattern encoding method.
Figure 10:
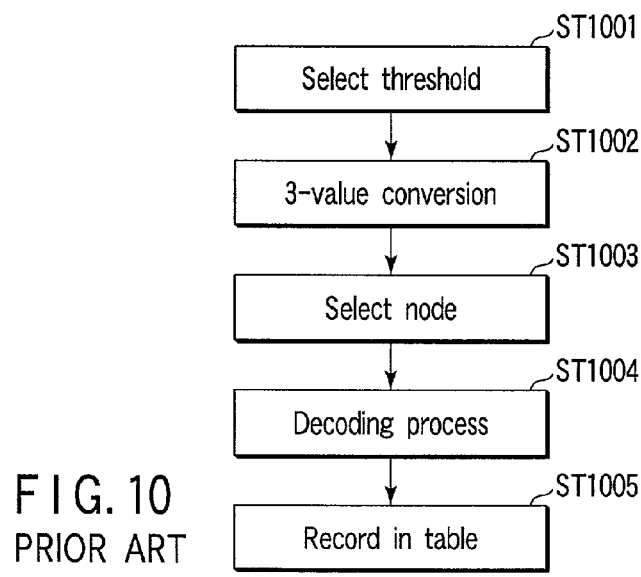
FIG. 10 is a block flow chart illustrating the process in the prior-art spatial pattern encoding method.
Figure 11:
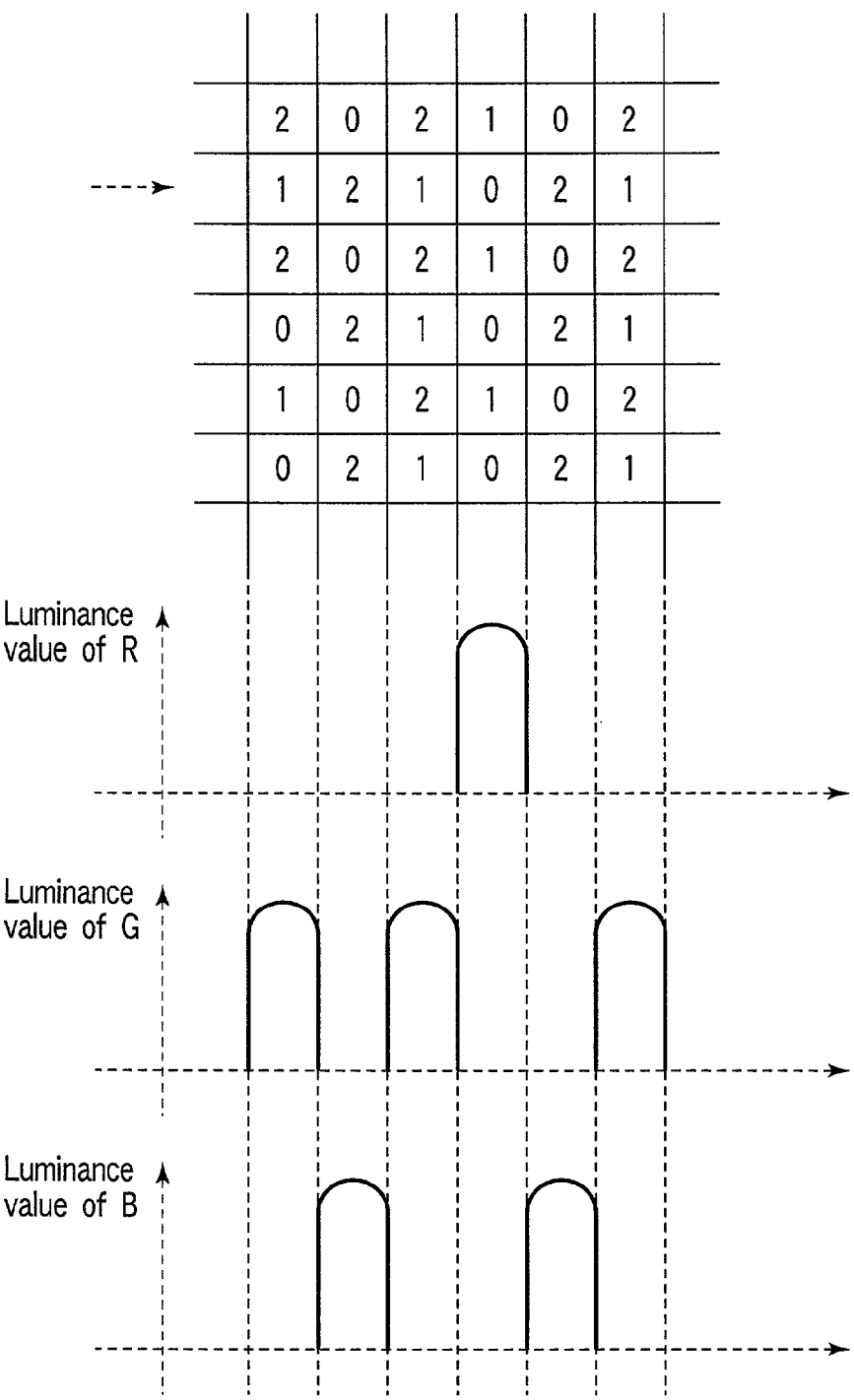
FIG. 11 shows an encoded light pattern structure in prior-art matrix pattern light projection.
Figure 12:
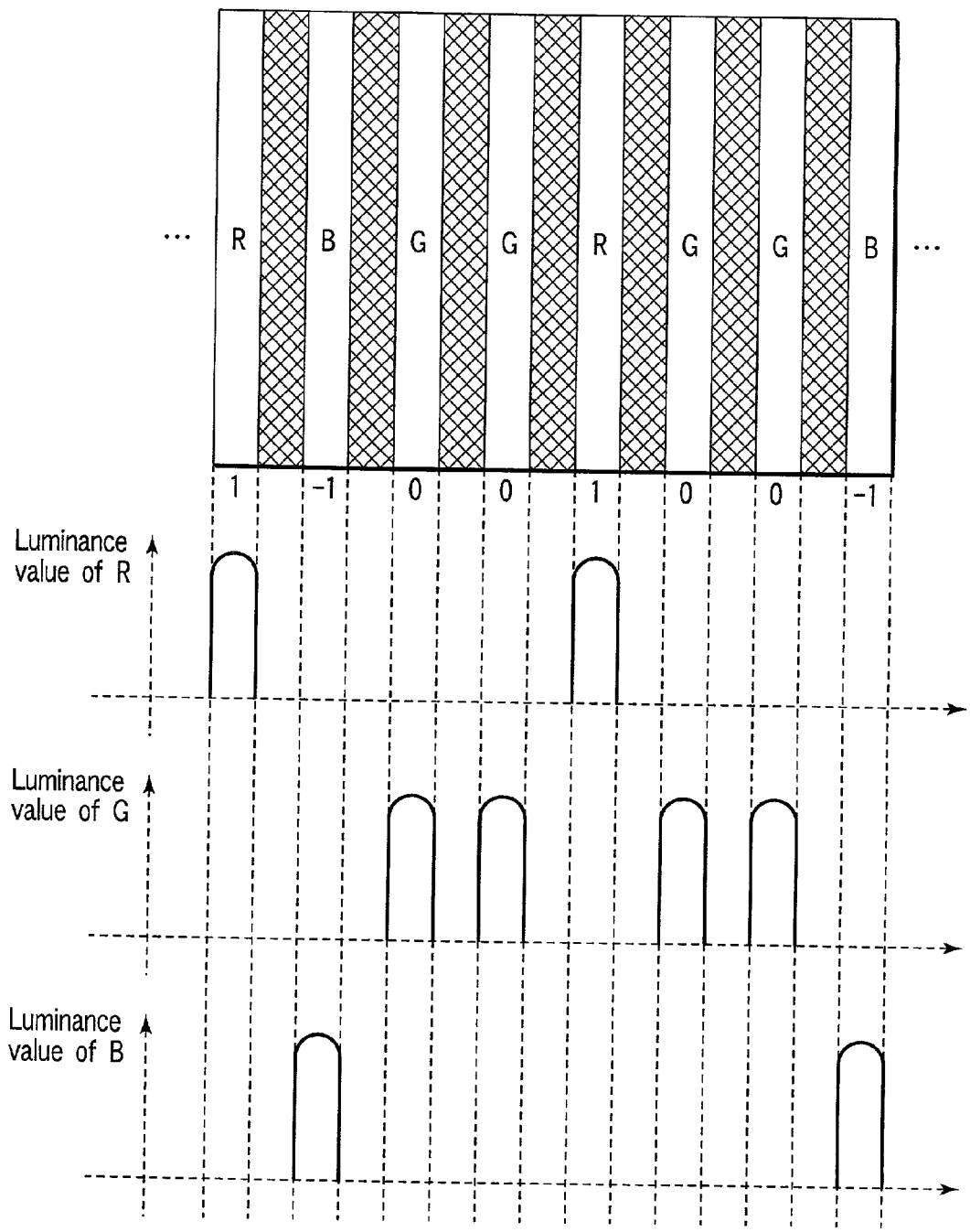
FIG. 12 shows a light pattern structure in prior-art matrix pattern light projection.

FIG. 8 shows a pattern used in the 3D image acquisition method according to the fifth embodiment of the invention. This pattern structure is characterized in that the pattern is a gradation matrix pattern using gray scale values and local maximums and local minimums are alternately arranged in a two-dimensional fashion.

Since the local maximums and local minimums are alternately arranged in a two-dimensional fashion in the pattern used in the fifth embodiment, the extraction of a matrix image (boundaries of a block in a matrix) is advantageously facilitated, compared to the prior art.

According to this stripe pattern, encoding is effected by using 2×2 blocks, instead of encoding using four successive numerals. Thus, the possibility of breaking of a code is advantageously reduced in the case of measuring a vertically elongated object or a square object.

(Sixth Embodiment)

Although not shown, a sixth embodiment of the invention employs a matrix pattern in which blocks of the matrix, which have local maximum and minimum luminance values, are aligned among R, G and B. The structure of the 3D image acquisition apparatus may be substantially equivalent to that of the preceding embodiment.

According to the sixth embodiment, since encoding for R, G and B is individually performed, the decoding process can be performed by combining the individual encoding of R, G and B and the reliability for the decoding is enhanced.

(Seventh Embodiment)

A seventh embodiment of the invention employs a matrix pattern (not shown) configured to have blocks of local maximum/minimum luminance values shifted among R, G and B.

Similarly, the structure of the 3D image acquisition apparatus may be substantially equivalent to that of the preceding embodiment.

According to the seventh embodiment, the use of this matrix pattern is advantageous in that if the reflectances of all R, G and B signals are not at the noise level, the chroma become higher than in the case where the blocks of local maximum/minimum luminance values of all R, G and B are aligned, and the color determination process becomes easier.

(Modification)

The present invention may be modified as follows. In the above-described embodiments, the luminance (gradation) pattern adopts four gradations. From the standpoint of wide variety, it is preferable to provide at least three gradations. Besides, from the standpoint of easy recognition, it is preferable to provide six or less gradations, more preferably, five or less gradations.

It is desirable that the entire pattern has the feature that areas with local maximum luminance and areas with local minimum luminance are alternately arranged. However, since corner portions are not actually used, there arises no practical problem if that part of the pattern, which is within the visual field of the imaging optical system, has this feature. Considering the fact that the distance between the pattern projection means and the imaging means is sufficiently less than the distance between the pattern projection means and the object, it should suffice if this feature is realized on that part of the projected pattern, which is projected within the range of the same solid angles as the imaging angles of the imaging means.

In the case where the imaging angles are 10° in the vertical direction and 15° in the horizontal direction, there is no practical problem if that part of the projected pattern, which is projected within the range of 10° in the vertical direction and 15° in the horizontal direction, has the feature that areas with local maximum luminance and areas with local minimum luminance are alternately arranged.

Other modifications may be made without departing from the spirit of the invention.

The embodiments of the invention have been described. The present specification includes the following inventions.

(1) There is provided a spatial pattern encoding method wherein blocks or areas with local maximum and minimum luminance values are alternately arranged and a code is generated by combining local maximum/minimum information and gradation information. Since the local maximums and local minimums are alternately arranged, extraction of a stripe image (stripe boundary) can be made easy.

(2) There is provided a spatial pattern encoding method of item (1) wherein a stripe pattern or a matrix pattern is employed. Pattern projection images are obtained by imaging elements situated at locations of two or more viewpoints. Not only the correspondency between a projection-light pattern and a reception-light pattern but also the correspondency between plural images is performed. Thus, more exact correspondency is achieved and the measurement precision and reliability are enhanced.

(3) There is provided a spatial pattern encoding method of item (1) wherein encoding is performed in substantially independent wavelength bands of, e.g. R, G and B. Since encoding for R, G and B is individually performed, the decoding process can be performed by combining the individual encoding of R, G and B and the reliability for the decoding is enhanced.

(4) There is provided a spatial pattern encoding method of item (3) wherein blocks or areas with local maximum luminance values and local minimum luminance values of R, G and B are aligned. Since blocks with local maximum and minimum values are alternately arranged, the extraction of a matrix image (division of a block) can be made easier than in the prior art.

(5) There is provided a spatial pattern encoding method of item (3) wherein blocks or areas with local maximum luminance values and local minimum luminance values of R, G and B are shifted. As a result, if the reflectances of all R, G and B signals are not at the noise level, the chroma become higher than in the case where the stripes of local maximum/minimum luminance values of all R, G and B are aligned, and the color determination process becomes easier.

(6) There is provided a 3D image acquisition apparatus comprising:
  a pattern projection section which projects a spatial encoding pattern of item (1);
  a pattern memory which stores the pattern that is projected by the pattern projection section;
  a light reception section which receives reflection light;
  an image memory which stores information of the light received by the light reception section;
  a depth calculation section which calculates depth information of an object on the basis of the pattern stored in the image memory and the pattern stored in the pattern memory;
  a 2D image information generating section which generates 2D image information on the basis of the information stored in the image memory; and
  a 3D image generating section which generates a 3D image on the basis of the 2D image information generated by the 2D image information generating section and the depth value calculated by the depth calculation section.

As a result, since encoding for R, G and B is individually performed, the decoding process can be performed by combining the individual encoding of R, G and B and the reliability for the decoding is enhanced.

(7) There is provided a 3D image acquisition apparatus according to item (6), comprising:
  a plurality of said light reception sections and a plurality of said image memories;
  a correspondency determination section which matches the contents of the image memories and collates the images;
  the depth calculation section which calculates 3D information of the object on the basis of information determined by the correspondency determination section; and
  a 3D image generating section which generates a 3D image on the basis of information generated by the 2D image information generating section and the value calculated by the depth calculation section.

According to the structure of item (7) of the present invention, if the reflectances of all R, G and B signals are not at the noise level, the chroma become higher than in the case where the blocks of local maximum/minimum luminance values of all R, G and B are aligned, and the color determination process becomes easier.

As has been described above, in the present invention, each band of R, G and B is encoded based on the combination of local maximum/minimum information and gradation information. The range of objects for 3D shape measurement is not limited to white-based color objects and low-saturation color objects and is increased.

Moreover, the present invention may provide a 3D image acquisition method for performing spatial pattern encoding and a 3D image acquisition apparatus for carrying out this method, wherein stripe boundary extraction from a stripe pattern projection image and block boundary extraction from a matrix pattern projection image can exactly be performed, and exact decoding is performed from an encoded projection image of an object even where the object is not of a white-based color or a low-saturation color.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A 3D image acquisition apparatus comprising:
  a pattern projection section which projects a predetermined pattern on an object;
  an imaging section which is positioned at a predetermined distance from said pattern projection section and which images the object having the predetermined pattern projected thereon; and
  a depth calculation section which detects an image pattern based on an image acquired by said imaging section, collates the detected image pattern and the predetermined pattern, and calculates a depth of respective parts of the object based on the collation;
  wherein the predetermined pattern includes patterns of a plurality of color components, and the pattern of each of the plurality of color components includes local maximum areas with local maximum luminance values and local minimum areas with local minimum luminance values, wherein in the pattern of each of the plurality of color components a total number of the local maximum luminance values and the local minimum luminance values is at least three, and wherein the local maximum areas are arranged alternately with the local minimum areas to encode the pattern of each of the plurality of color components based on the arrangement of the local maximum areas and the local minimum areas and the luminance values corresponding to the respective local maximum areas and the respective local minimum areas; and wherein in the patterns of each of the plurality of color components, positions of the local maximum areas and positions of the local minimum areas are the same.

2. A 3D image acquisition apparatus comprising:

a pattern projection section which projects a predetermined pattern on an object;

an imaging section which is positioned at a predetermined distance from said pattern projection section and which images the object having the predetermined pattern projected thereon; and a depth calculation section which detects an image pattern based on an image acquired by said imaging section, collates the detected image pattern and the predetermined pattern, and calculates a depth of respective parts of the object based on the collation;

wherein the predetermined pattern includes patterns of a plurality of color components, and the pattern of each of the plurality of color components includes local maximum areas with local maximum luminance values and local minimum areas with local minimum luminance values, wherein in the pattern of each of the plurality of color components a total number of the local maximum luminance values and the local minimum luminance values is at least three, and wherein the local maximum areas are arranged alternately with the local minimum areas to encode the pattern of each of the plurality of color components based on the arrangement of the local maximum areas and the local minimum areas and the luminance values corresponding to the respective local maximum areas and the respective local minimum areas; and wherein positions of the local maximum areas in the pattern of at least one of the plurality of color components are the same as positions of the local minimum areas in the patterns of the others of the plurality of color components.

3. A 3D image acquisition apparatus according to claim 2, wherein said plurality of color components are RGB components.

4. A method for encoding a spatial pattern for 3D image acquisition, said method comprising:

generating a spatial encoding pattern including local maximum areas with local maximum luminance values and local minimum areas with local minimum luminance values, wherein a total number of the local maximum luminance values and the local minimum luminance values is at least three; and alternately arranging the local maximum areas with the local minimum areas to encode the predetermined pattern based on the arrangement of the local maximum areas and the local minimum areas and the luminance values corresponding to the respective local maximum areas and the respective local minimum areas;

wherein the spatial encoding pattern is encoded in substantially independent wavelength bands; and wherein the wavelength bands are R, G and B and the local maximum areas and the local minimum areas of each of R, G and B are aligned.

5. A method according to claim 4, wherein the spatial encoding pattern is one of a stripe pattern and a matrix pattern.

6. A 3D image acquisition apparatus according to claim 1, wherein said plurality of color components are RGB components.

7. A 3D image acquisition apparatus according to claim 2, wherein the predetermined pattern is one of a stripe pattern and a matrix pattern.

8. A 3D image acquisition apparatus according to claim 1, wherein the predetermined pattern is one of a stripe pattern and a matrix pattern.

* * * * *